M. ZAWISTOWSKI, D. PERLMAN & N. KOMOW.
KNIFE GUARD FOR CLOTH CUTTING MACHINES.
APPLICATION FILED DEC. 29, 1913.
1,147,690.
Patented July 20, 1915.
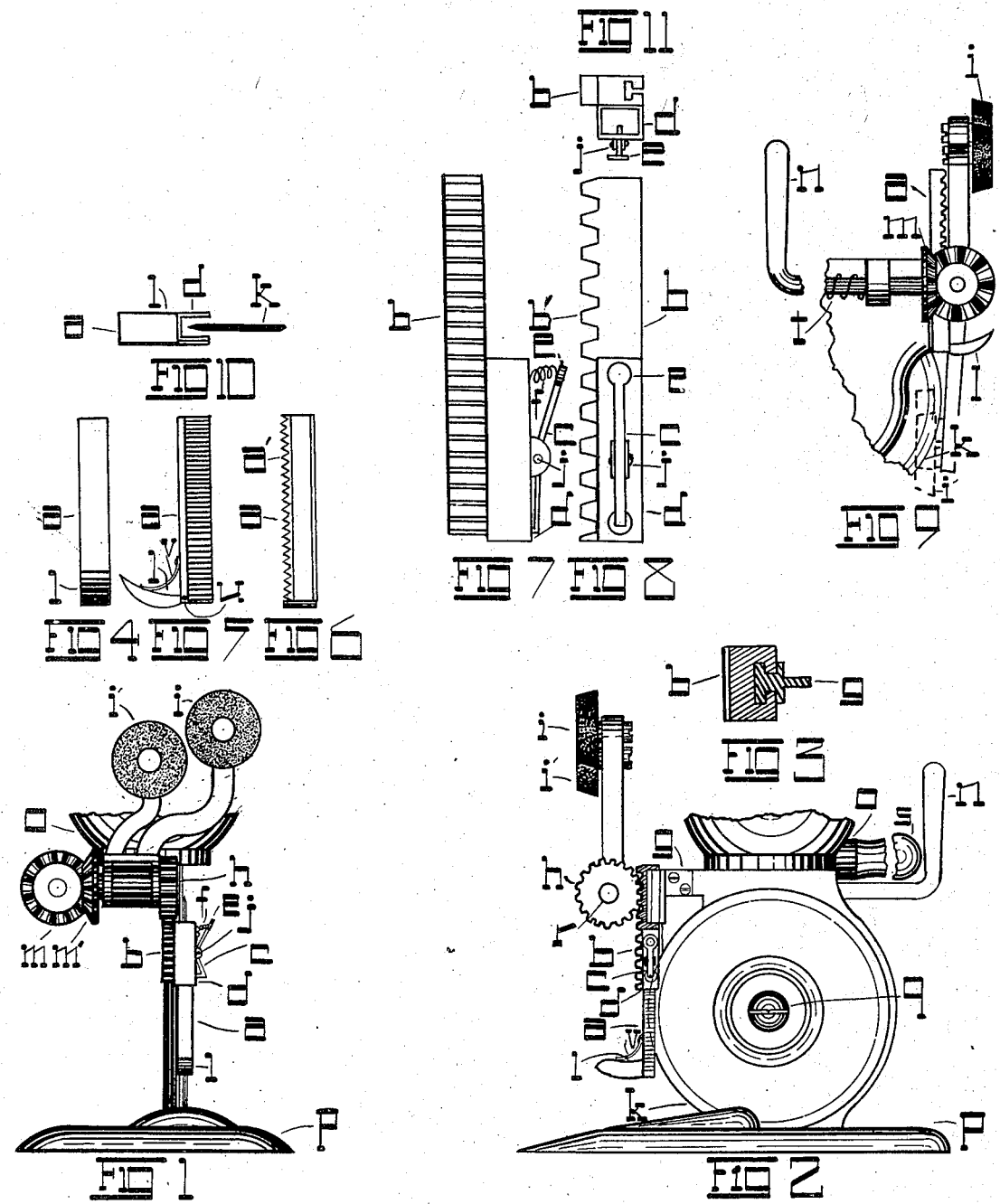
Witnesses:-
Louis Lichtman
Stanley Widlarz
Inventors:-
Martin Zawistowski
David Perlman
Nicolas Komow

UNITED STATES PATENT OFFICE.

MARTIN ZAWISTOWSKI, DAVID PERLMAN, AND NICOLAS KOMOW, OF NEW YORK, N. Y., ASSIGNORS TO THE U. S. CLOTH CUTTING MACHINE CO., INC., OF NEW YORK, N. Y.

KNIFE-GUARD FOR CLOTH-CUTTING MACHINES.

1,147,690.

Specification of Letters Patent.

Patented July 20, 1915.

Application filed December 29, 1913. Serial No. 809,369.

*To all whom it may concern:*

Be it known that we, MARTIN ZAWISTOWSKI, a citizen of the United States, residing at No. 532 East Eighteenth street, borough of Manhattan, city, county, and State of New York, DAVID PERLMAN, a subject of the Czar of Russia, residing at No. 72 West One hundred and thirteenth street, borough of Manhattan, city, county, and State of New York, and NICOLAS KOMOW, a citizen of the United States, residing at No. 421 East Third street, borough of Brooklyn, city of New York, county of Kings, and State of New York, have invented a new and useful Knife-Guard for Cloth-Cutting Machines, of which the following is a specification.

This invention relates to knife guards for circular knife cloth cutting machines with automatic grinding attachments, actuating grinder and guard simultaneously, and the object of our invention is:—first, to provide a knife guard that will protect the operator from being injured; second, to be easily adjusted to any layer of cloth being cut, and retain same adjustment through the entire process of cutting said layer of cloth; third, to afford facilities for the automatic removal of the guard when the knife is to be sharpened by the automatic grinder without disturbing the adjustment of the guard and never leave the edge of the knife unprotected.

We attain these objects by the mechanism illustrated in the accompanying drawings, in which, Figure 1 is a front view of the lower part of a circular knife cloth cutting machine with our improved attachment applied thereto. Fig. 2 is a side view of the lower part of a circular knife cloth cutting machine with our attachment in operative position. Fig. 3 is a sectional view of the sliding part of our attachment. Fig. 4 is a front view of the lower section of our guard. Fig. 5 is a side view of Fig. 4. Fig. 6 is a back view of the lower part of our guard. Fig. 7 is a front view of the upper portion of the guard showing the locking device. Fig. 8 is a side view of Fig. 7. Fig. 9 is a back view of a part of Fig. 2. Fig. 10 is a top view of the guard showing how it guards the edge of the knife. Fig. 11 shows a top view of the sliding portion of the guard.

Similar letters of reference indicate corresponding parts throughout the various figures.

Referring to the drawings and more particularly to Figs. 1 and 2, the cloth cutting machine is provided with means for supporting the motor at *o*. To standard *p* is secured the circular knife *k*, by means of stud *q*, which cuts the cloth as the machine is moved along, laterally by means of the handle *s*. A grinding device *i* and *i'* is arranged and swings on pin *r*, which is operated by miter gear *m* and *m'* and actuated by crank *n*. The spring *t* tends to maintain the grinders in the upward position. If, however, the knife is to be ground then the crank *n* is operated and brings the grinders *i* and *i'* to the knife edge, and the continuous rotation of the knife edge against the grinding wheels causes the knife to be sharpened. These parts are all well-known in cloth cutting machines.

The object of this invention is to provide means for speedy grinding without throwing the guard out of adjustment, and automatically remove the guard permitting the grinders to come in contact with the edge of the knife, also to prevent injury to the operator.

Our invention consists in providing an attachment to circular knife cloth cutting machines whereby the knife edge is protected as shown in Fig. 1 and Fig. 2.

To the motor holding means *o*, guard support *g* is attached over which slides guard holder *b*. To guard holder *b* is fastened a tube *d* into which slides guard *a*. The surface of one side of guard *a* is corrugated as shown in Fig. 6. The locking lever *c*, which holds guard *a* in its position in relation to the height of cloth to be cut, is fastened to tube *d* and fulcrums at *j*. Spring *f* forces lever *c* into the corrugations *a'* of guard *a* to prevent slipping of the guard.

When it is necessary to adjust the guard *a* to a certain height for a layer of cloth that is to be cut, the handle *e* of locking lever *c* is pressed so as to overcome the tension of the spring *f*, and the lever *c* releases its hold on the corrugations *a'* of guard *a*.

When the knife is to be sharpened crank *n* is turned and actuates miter gear *m*, which in turn engages miter gear *m'* and turns pin *r*, on which is fastened pinion *h*. Pinion *h* engages rack *b'* of guard holder *b* and while turning raises guard holder *b* so as to clear the edge of the knife for the grinders. As soon as the grinding operation is over spring *t* forces grinders *i* and *i'* to their upward position and at the same time guard *a* is lowered. Swinging foot *l* is hinged at *u* to the bottom part of guard *a*, and pressed down by spring *v* to overcome any unevenness in the layers of cloth.

As shown in Fig. 10 the knife guard is U shaped so as to inclose the edge of the knife perfectly.

Our invention has the advantage of protecting the operators from being injured during the operation of the cloth cutting machines, and thereby serious injury may be prevented, the protecting means being always movable with the grinding means. If the guard does not protect the edge of the knife the grinder protects it.

Having described our invention, we claim as new and desire to secure by Letters Patent.

1. In a circular-knife cloth-cutting machine, the combination with grinders, of a knife-guard having a rack connected therewith, and a pinion for driving the rack to operate the guard in conjunction with the grinders.

2. A circular-knife cloth-cutting machine, comprising in combination with the standard, knife and motor, a knife-guard having a rack, grinders having a gear, and manual operating means and connections for driving the guard rack and grinder gear.

3. In a circular-knife cloth-cutting machine, the combination with the knife, of a swinging grinding device mounted on a transverse axis over the knife, a suitably guided knife-guard and rack, and a pinion on the axis of the grinding device for driving said rack.

4. Guard and grinder mechanism for circular-knife cloth-cutting machines, comprising, in combination a swinging grinding device mounted on a transverse axis, a manual operating device connected by gearing with said grinding device, a knife-guard having a rack, and a gear connection between the grinding device and said rack.

5. In a rotary-knife cloth-cutting machine, the combination with grinders, of a rectilinearly movable knife-guard having a straight rack connected therewith, and a pinion for driving the rack to operate the guard in conjunction with the grinders.

6. In a rotary-knife cloth-cutting machine, the combination of a swinging grinding device, a knife-guard having a rack, and a gear element united with the grinding device to mesh with said rack, whereby the guard and grinding device may be operated reversely to each other.

7. In a rotary-knife cloth-cutting machine, the combination of a grinding device mounted to swing on a transverse axis, a knife-guard having a rack, a gear element on the axis of the grinding device to mesh with the rack, and suitable means for operating the grinding device and gear element.

8. In a rotary-knife cloth-cutting machine, a knife guard comprising a raising and lowering member, a guard member slidably adjustable up and down on the raising and lowering member, and a lever engaging depressions for holding the guard member at the desired elevation on the raising and lowering member.

9. In a rotary-knife cloth-cutting machine, the combination with the standard bearing the knife, of a rectilinear guide on the standard, a two-part knife-guard comprising a rack-bearing member slidable on said guide, and a lower guard member adjustable up and down on the rack-bearing member, a spring-pressed lever on the rack-bearing member for holding and releasing the lower guard member, and raising and lowering mechanism for operating the rack-bearing member.

10. In a rotary-knife cloth-cutting machine, the combination with the standard and knife, of a knife-guard adapted to be raised and lowered as a whole and having a lower adjustable portion, and a yielding foot pivotally mounted on said adjustable portion.

11. In a circular knife cloth cutting machine an attachment for protecting the cutting knife, and a telescoping guard having a corrugated surface, and a lever and means to hold the guard in adjustment, substantially as described.

MARTIN ZAWISTOWSKI.
DAVID PERLMAN.
NICOLAS KOMOW.